United States Patent [19]

Ogawa et al.

[11] Patent Number: 6,042,948
[45] Date of Patent: Mar. 28, 2000

[54] WATER REPELLENT COATING FILM, METHOD AND APPARATUS FOR MANUFACTURING THE SAME, AND WATER REPELLENT COATING MATERIAL COMPOSITION

[75] Inventors: Kazufumi Ogawa, Nara; Yasuo Takebe, Kyoto; Norihisa Mino, Nara, all of Japan

[73] Assignee: Matsushita Electric Industrial Co., Ltd., Osaka, Japan

[21] Appl. No.: 08/792,133

[22] Filed: Jan. 31, 1997

[30]       Foreign Application Priority Data

| Feb. 1, 1996 | [JP] | Japan | 8-016351 |
| Mar. 19, 1996 | [JP] | Japan | 8-063025 |
| Mar. 21, 1996 | [JP] | Japan | 8-065022 |
| Mar. 26, 1996 | [JP] | Japan | 8-070054 |

[51] Int. Cl.$^7$ ..................................................... B32B 9/04
[52] U.S. Cl. .......................... 428/447; 428/377; 428/405; 428/457; 428/704; 106/287.16; 106/287.19; 106/287.13
[58] Field of Search ................................. 428/447, 377, 428/405, 457, 704; 106/287.16, 287.19, 287.13

[56]              References Cited

U.S. PATENT DOCUMENTS 5,266,222  11/1993  Willis et al. .......................... 252/49.006
5,545,255  8/1996  Ogawa ..................................... 106/272

FOREIGN PATENT DOCUMENTS 050126482  5/1993  Japan .

*Primary Examiner*—Margaret G. Moore
*Attorney, Agent, or Firm*—Morrison & Foerster LLP

[57]             ABSTRACT

By forming a film that comprises a microcrystalline polymer having at least a fluorocarbon group and has a rough surface on a surface of a base material, super-water-repellency is provided, the dew condensation water of an air conditioner, for example, can be easily removed, and the freezing of the fin of the heat exchanger can be prevented. A fin that is made of aluminium is coated with a solution for forming a coating film, in which $CF_3(CF_2)_7-(CH_2)_2-SiCl_3$ is diluted with nonaqueous cyclohexamethyl trisiloxane at a concentration of 10 vol. % for preparation, to a thickness of 1 to 10 μm by a brush, and then the cyclohexamethyl trisiloxane is vaporized in an atmosphere having a relative humidity of about 75% at room temperature. $CF_3(CF_2)_7-(CH_2)_2-SiCl_3$ that remained on the fin is rapidly hydrolyzed with the moisture in the atmosphere, and the moisture in air and a $-SiCl_3$ group dehydrochlorinated to form a microcrystalline polymer on the fin. As a result, a coating film having a surface roughness in the range of 1 to 40 μm and a contact angle of about 171° to water can be formed.

12 Claims, 4 Drawing Sheets

WATER REPELLENT COATING FILM, METHOD AND APPARATUS FOR MANUFACTURING THE SAME, AND WATER REPELLENT COATING MATERIAL COMPOSITION

FIELD OF THE INVENTION

The present invention relates to a water repellent coating film, a method and an apparatus for manufacturing the same, and a water repellent coating material composition, and more particularly to a water repellent coating film that comprises a microcrystalline polymer having at least a fluorocarbon group and has a rough surface.

BACKGROUND OF THE INVENTION

Conventionally, a method for coating a surface with a hydrophilic resin is used for the fin of the heat exchanger of an air conditioner, etc. in order to more readily eliminate dew condensation water during operation. However, with traditional methods for making a surface hydrophilic, dew condenses and freezes, i.e., frost forms, particularly during winter in cold environments. This frozen water is difficult to eliminate and reduces operating efficiency. In fact, air conditioning operation must be occasionally stopped to melt and remove the frost which builds up.

Thus, both an extra heater, and enregy it uses, is required for removing frost. Also, such a process is not desired as air conditioning operation must be occasionally stopped.

SUMMARY OF THE INVENTION

In order to solve conventional problems, the present invention seeks to provide a coating film that has a high contact angle to a water drop and excellent water repellency as well as a method for manufacturing the same. Further, the present invention aims to provide a water repellent coating film that facilitates removal of the dew which condenses on an air conditioner to prevent the fin of the heat exchanger from freezing and allow continuous operation of air conditioning.

In one aspect, a first coating film of the present invention comprises a polymer having a fluorocarbon group formed on a surface of a substrate, wherein the film comprises a microcrystalline polymer and has a rough surface, and a part of molecules forming the film are covalently bonded to the surface of the substrate. Such a structure can provide a coating film that has a high contact angle to a water drop and excellent water repellency. Also, the structure can improve the water separation of the surface of the base material.

In the above structure, it is preferable that the microcrystalline polymer having a fluorocarbon group is crosslinked by at least a siloxane (—SiO—) bond or a titanium-oxygen (—TiO—) bond. This example can provide excellent durability and improve the water separation of the surface of the base material.

A second coating film of the present invention comprises a fine particle or a whisker as a core and a microcrystalline polymer having a fluorocarbon group that is formed to "wrap" the fine particle or the whisker, and has a rough surface. Such a structure can provide a coating film that has a high contact angle to a water drop and has excellent water repellency. Also, the structure can improve the water separation of the surface of the base material.

In the above structure, it is preferable that the microcrystalline polymer having a fluorocarbon group is crosslinked by at least a siloxane (—SiO—) bond or a titanium-oxygen (—TiO—) bond. This example can provide excellent durability and improve the water separation of the surface of the base material.

In the above structure, it is further preferable that the microcrystalline polymer having a fluorocarbon group that is crosslinked by a siloxane bond or a titanium-oxygen bond is formed by a hydrolysis reaction. This can provide a less impurity content and excellent durability and improve the water separation of the surface of the base material.

In the above structure, it is still further preferable that the roughness of the surface is in the range of 0.1 to 100 $\mu$m. This can provide a less impurity content, excellent durability, and super-water-repellency, and improve the water separation of the surface of the base material.

In the above structure, it is preferable that the roughness of the film is in the range of 0.1 to 100 $\mu$m. This can provide excellent durability and super-water-repellency and improve the water separation of the surface of the base material.

In the above structure, it is preferable that the film is cloudy with a color of white or is opaque. This can provide high crystal strength, excellent durability, and super-water-repellency, and improve the water separation of the surface of the base material.

A water repellent heat exchanger fin according to the present invention comprises a water repellent coating film that has a fluorocarbon group and a rough surface and is formed on a surface of a base material. This structure can effectively remove the dew that condenses on an air conditioner to prevent the fin of the heat exchanger from freezing and allow continuous operation of air conditioning.

In the above structure, it is preferable that the water repellent coating film is formed on a surface of a base material which, during processing, is provided with a rough surface. In other words, by forming the film that comprises a microcrystalline polymer having a fluorocarbon group and has a rough surface on the surface of the base material, the water separation of the surface of the base material of the water repellent heat exchanger fin can be improved.

In the above fin, it is preferable that the roughness of the surface of the base material is in the range of 0.1 to 50 $\mu$m. This structure is unlikely to cause the peeling of the coating film. The structure can provide excellent durability and super-water-repellency and improve the water separation of the surface of the base material.

An air conditioner according to the present invention uses a fin with a water repellent coating film formed in the heat exchange part. This structure can provide an energy-saving air conditioner that has very high water repellent efficiency and provides excellent amenity. In other words, this structure can easily remove the dew that condenses on an air conditioner even in cold environments to prevent the fin of the heat exchanger from freezing and allow continuous operation of air conditioning.

A water repellent coating material composition of the present invention comprises at least a material that has a hydrolyzable group having Si or Ti and a fluorocarbon group, a fine particle or a whisker, and a nonaqueous organic solvent. This coating material can provide a water repellent coating film with a very high manufacturing efficiency.

In the above water repellent coating material composition, it is preferable that the nonaqueous organic solvent is at least one solvent selected from the group consisting of xylene, toluene, normal paraffin, and silicone. The use of such a solvent allows efficiently growing a microcrystal in manufacturing a water repellent coating film.

In the above water repellent coating material composition, it is preferable that, as the material that has a hydrolyzable group having Si or Ti and a fluorocarbon group, a material that is expressed by $CF_3—(CF_2)_n—(R)_m—SiX_pCl_{3-p}$ is used as a main component, in which n represents 0 or an integer, R represents an alkylene group, a vinylene group, an ethynylene group, an arylene group such as phenylene group, silicon, or a substituent having an oxygen atom, m represents 0 or 1, X represents H, an alkyl group, an alkoxy group, an isocyanate group, a fluorine-containing alkyl group, or a fluorine-containing alkoxy group, and p represents 0, 1, 2 or 3. By using such a material, the water repellency and durability of the coating film can be further improved.

In the above composition, it is preferable that the amount of the material that has a hydrolyzable group having at least one element selected from the group consisting of Si and Ti and a fluorocarbon group is 1 to 50% by weight, the amount of at least one filler selected from the group consisting of a fine particle and a whisker is 1 to 30% by weight, and the amount of the nonaqueous organic solvent is 20 to 98% by weight based on the total weight of the composition.

A method for manufacturing a first water repellent coating film of the present invention comprises coating a surface of a base material with a material that has a hydrolyzable group having at least Si or Ti and a fluorocarbon group in one molecule, and hydrolyzing a coating film comprising the material in an atmosphere containing moisture to provide a film comprising a microcrystalline polymer having a fluorocarbon group that is at least crosslinked by a siloxane bond or a titanium-oxygen (—TiO—) bond. This structure can efficiently provide a coating film that has excellent durability, super-water-repellency, and excellent water separation.

A method for manufacturing a second water repellent coating film of the present invention comprises coating a surface of a base material with a coating material composition comprising a material that has a hydrolyzable group having Si or Ti and a fluorocarbon group and a fine particle or a whisker, and hydrolyzing a coating film comprising the coating material composition in an atmosphere containing moisture to provide a film comprising at least a fine particle or a whisker and a microcrystalline polymer having a fluorocarbon group that is crosslinked by a siloxane bond or a titanium-oxygen bond. This structure can efficiently provide a coating film that has excellent durability, super-water-repellency, and excellent water separation.

In the above method, it is preferable that the hydrolyzable group having Si or Ti is at least one selected from the group consisting of a halosilyl group, an alkoxysilyl group, a silane group, an isocyanate silane group, an alkoxytitanium group, a titanium halide group, and an isocyanate titanium group. This can provide a coating film that has a less impurity content, excellent durability, super-water-repellency, and excellent water separation.

The present invention can comprise a film that comprises a microcrystalline polymer having at least a fluorocarbon group and has a rough surface. It is convenient in durability if the microcrystalline polymer having a fluorocarbon group is at least crosslinked by a siloxane bond or a titanium-oxygen (—TiO—) bond. Also, it is further excellent in durability if the microcrystalline polymer having a fluorocarbon group that is crosslinked by a siloxane bond or a titanium-oxygen bond is manufactured by a hydrolysis reaction. Also, when the roughness of the surface is at least 0.1 to 100 µm, preferably 0.5 to 50 µm, very high water repellency can be obtained, and therefore a coating film that has excellent water separation can be obtained. Particularly, when the roughness is 0.5 to 50 µm, a contact angle of 160° to water can be obtained.

As a method for manufacturing such a coating film, a method comprising, after coating a surface of a base material with a material that has a hydrolyzable group having at least Si or Ti and a fluorocarbon group, hydrolyzing a coating film comprising the material in an atmosphere containing moisture to grow a microcrystal can be used. As a result, a film comprising a microcrystalline polymer having a fluorocarbon group that is at least crosslinked by a siloxane bond or a titanium-oxygen bond can be manufactured. When the hydrolyzable group having Si or Ti is a halosilyl group, an alkoxysilyl group, a silane group, an isocyanate silane group, an alkoxytitanium group, a titanium halide group, or an isocyanate titanium group, a hydrolysis reaction can occur very easily, which is convenient in the manufacturing process.

When applying the present invention to a heat exchanger fin, the manufacturing method comprises a step of roughening a surface of a base material, a step of coating the surface of the base material with a material that has a hydrolyzable group having Si or Ti and a fluorocarbon group, and a step of hydrolyzing a coating film comprising the material in an atmosphere containing moisture to provide a film comprising a microcrystalline polymer having a fluorocarbon group that is crosslinked by a siloxane bond or a titanium-oxygen bond. According to the above method, a heat exchanger fin that has excellent durability, super-eater-repellency, and excellent water separation can be efficiently manufactured.

In the above method, it is preferable that the hydrolyzable group having Si or Ti is at least one organic group selected from the group consisting of a halosilyl group, an alkoxysilyl group, a silane group, an isocyanate silane group, an alkoxytitanium group, a titanium halide group, and an isocyanate titanium group. This structure can provide a heat exchanger fin that has a lower impurity content, excellent durability, super-water-repellency, and excellent water separation. A coating apparatus for a hydrolysis-hardening coating material can comprise a dipping vessel for putting a hydrolysis-hardening coating material in, and a seal gas supplying means provided in a gas phase part of the dipping vessel for preventing a surface of the hydrolysis-hardening coating material from being in direct contact with moisture in the air. Thus, in coating with a hydrolysis-hardening coating material, the coating process can be continuously performed by using an open system, while preventing the degradation of the coating material due to the moisture in air.

In the above apparatus. it is preferable that the seal gas is dry air or a gas heavier than air. When using dry air, it is preferable to continuously circulate the dry air. When using a gas heavier than air, the gas is occasionally circulated according to the degree of diffusion.

A coating method for a hydrolysis-hardening coating material comprises the use of a coating apparatus comprising a dipping vessel for a hydrolysis-hardening coating material comprising a compound that has a hydrolyzable group having at least Si or Ti and a fluorocarbon group and a nonaqueous solvent, and a seal gas supplying means connected to a gas phase part of the dipping vessel. In particular, the method comprises supplying a seal gas for sealing so that a surface of a hydrolysis-hardening coating material put in the dipping vessel is not in direct contact with moisture in the air, and coating a surface of a base material with the hydrolysis-hardening coating material by passing the seal gas through, dipping the base material in the hydrolysis-hardening coating material, and pulling the base material up. According to this method, coating can be performed, while preventing the degradation of a hydrolysis-hardening coating material due to the moisture in the air. Of course, the coating process can be continuously performed by using an open system.

In the above method, it is preferable that the hydrolyzable group having Si or Ti is at least one organic group selected from the group consisting of a halosilyl group, an alkoxysilyl group, a silane group, an isocyanate silane group, an alkoxytitanium group, a titanium halide group, and an isocyanate titanium group. The above compound has excellent hydrolysis-hardenability and can be hardened in a very short time in hardening after coating with the coating material.

In the above method, it is preferable to manufacture a film that comprises a microcrystalline polymer having a fluorocarbon group that is at least crosslinked by a siloxane bond or a titanium-oxygen bond, by hydrolyzing a hydrolysis-hardening coating material in an atmosphere containing moisture to provide a hydrolysis-hardening coating material having a microcrystalline state, after coating a surface of a base material with the hydrolysis-hardening coating material. According to this method, in coating with a hydrolysis-hardening coating material, a water repellent coating film can be manufactured, while preventing the degradation of the coating material due to the moisture in air.

In the above method, it is preferable that the base material is a fin of a heat exchanger for an air conditioner. When applying it to a heat exchanger fin for an air conditioner, an energy-saving air conditioner having a very high efficiency and excellent amenity can be provided.

In the above method, it is preferable that the seal gas is dry air or a gas heavier than air.

In the above method, it is preferable that the gas heavier than air is at least one gas selected from the group consisting of carbon dioxide and argon. The use of carbon dioxide or argon can efficiently prevent the moisture in air from diffusing into the coating material.

BRIEF DESCRIPTION OF THE DRAWINGS

FIG. 1A is a cross-sectional view of a base material; FIG. 1B is a conceptual cross-sectional view in which a film that comprises a microcrystalline polymer having a fluorocarbon group and has a rough surface is formed on a surface of the base material, however, the present invention should not be limited to this conceptual view; FIG. 1C is a conceptual cross-sectional view in which an X part of a surface of the base material in FIG. 1B is enlarged, however, the present invention should not be limited to this conceptual view;

DETAILED DESCRIPTION OF THE INVENTION

The embodiments of the present invention will be described below referring to FIG. 1.

Figure 1A:
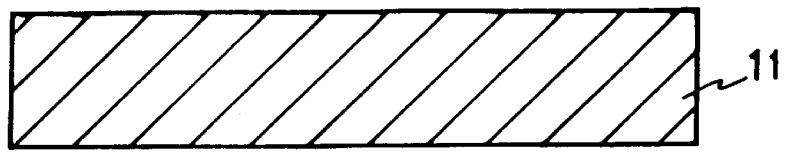
FIGS. 1A–1C show a manufacturing process of Example 1 of the present invention.
Figure 1B:
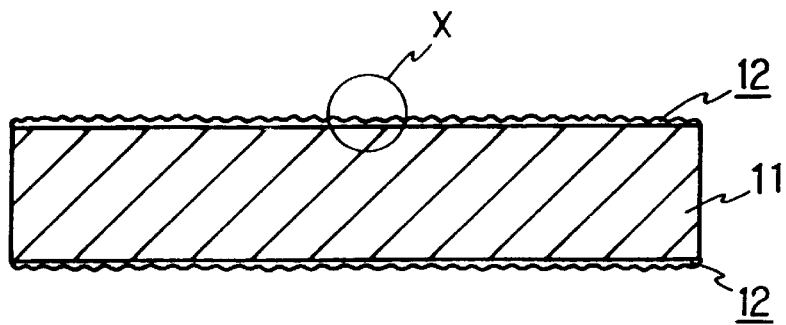
Figure 1C:
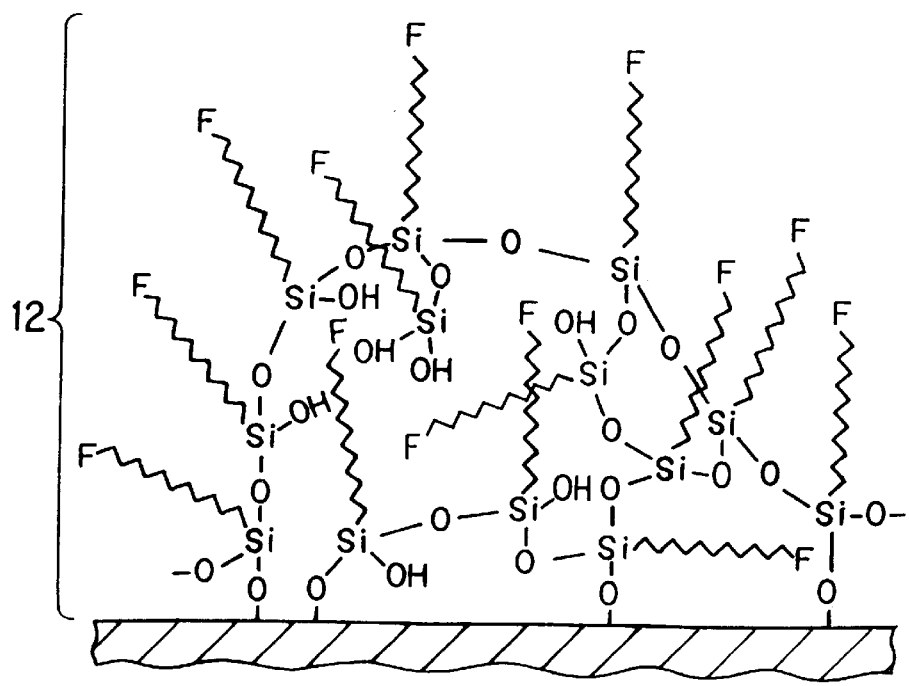

FIGS. 1A–1C show a process for manufacturing a first water repellent coating film of the present invention. FIG. 1A is a cross-sectional view of a base material. FIG. 1B is a conceptual cross-sectional view in which a film that comprises a microcrystalline polymer having a fluorocarbon group and has a rough surface is formed on a surface of the base material. FIG. 1C is a conceptual cross-sectional view in which an X part of a surface of the base material in FIG. 1B is enlarged to a micron level. A fin 11 is for performing heat exchange action between an air conditioner and the outside air and is formed of an aluminium sheet, etc. that has excellent heat conductivity. A film 12 that comprises a microcrystalline polymer having a fluorocarbon group and has a rough surface prevents frosting and is formed of a microcrystalline polymer having a fluorocarbon group that is crosslinked by a siloxane bond.

In the above description, film 12 that comprises a microcrystalline polymer having a fluorocarbon group and has a rough surface is formed of a microcrystalline polymer having a fluorocarbon group that is crosslinked by a siloxane bond. However, it is similarly practicable with crosslinking by a titanium-oxygen (—TiO—) bond.

A second water repellent coating film of the present invention is formed of a film that comprises at least a fine particle or a whisker as a core and a microcrystalline polymer having a fluorocarbon group that is formed to wrap the fine particle or the whisker, and has a rough surface. It is convenient in durability if the microcrystalline polymer having a fluorocarbon group is at least crosslinked by a siloxane bond or a titanium-oxygen bond. Also, the durability is improved, if the microcrystalline polymer having a fluorocarbon group that is crosslinked by a siloxane bond or titanium-oxygen bond is manufactured by way of a hydrolysis reaction. Also, fine particles such as alumina, silica, glass, or fluororesin, or whiskers such as silica, alumina, barium titanate can be easily treated. By selecting the one in which the average diameter of a primary particle is 5 nm to 100 $\mu$m, preferably 7 nm to 50 $\mu$m, and the roughness of a film surface after forming a coating film is 0.1 to 100 $\mu$m, preferably 0.5 to 50 $\mu$m, very high water repellency can be obtained, and therefore a coating film that has excellent water separation can be obtained. In particular, when the roughness is 0.5 to 50 $\mu$m, a contact angle of 160° or more to water can be obtained.

A method for manufacturing such a coating film comprises coating a surface of a base material with a coating material comprising a material that has a hydrolyzable group having at least Si or Ti and a fluorocarbon group and a fine particle or a whisker, and hydrolyzing a coating film comprising the material and the fine particle or the whisker in an atmosphere containing moisture to provide a coating film having a microcrystalline state. As a result, a film comprising at least a fine particle or a whisker and a microcrystalline polymer having a fluorocarbon group that is crosslinked by a siloxane bond or a titanium-oxygen bond can be manufactured. When the hydrolyzable group having Si or Ti is a halosilyl group, an alkoxysilyl group, a silane group, an isocyanate silane group, an alkoxytitanium group, a titanium halide group, or an isocyanate titanium group, a hydrolysis reaction can occur very easily.

Suitable materials having a fluorocarbon group and a hydrolyzable group include compounds having the following Formula 1 or 2.

Formula 1

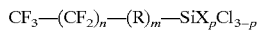

in which n represents 0 or an integer, R represents an alkylene group, a vinylene group, an ethynylene group, an arylene group such as phenylene group, silicon, or a substituent having an oxygen atom, m represents 0 or 1, X represents H, an alkyl group, an alkoxyl group, an isocyanate group, a fluorine-containing alkyl group, or a fluorine-containing alkoxy group, p represents 0, 1, 2 or 3.

Formula 2

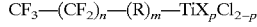

in which n represents 0 or an integer, R represents an alkylene group, a vinylene group, an ethynylene group, an arylene group such as phenylene group, silicon, or a substituent having an oxygen atom, m represents 0 or 1, X represents H, an alkyl group, an alkoxyl group, an isocyanate group, a fluorine-containing alkyl group, or a fluorine-containing alkoxy group, p represents 0, 1 or 2.

Specific examples of suitable materials in addition to the above reagents include compounds such as the following:

(1) $CF_3CH_2O(CH_2)_{15}SiHCl_2$
(2) $CF_3(CH_2)_2Si(CH_3)_2(CH_2)_{15}SiCl_3$
(3) $CF_3(CH_2)_6Si(CH_3)_2(CH_2)_9Si(OCH_3)Cl_2$
(4) $CF_3(CF_2)_7(CH_2)_2Si(CH_3)_2 (CH_2)_{10}SiCl_3$
(5) $CF_3COO(CH_2)_{15}Si(NCO)Cl_2$
(6) $CF_3(CF_2)_7(CH_2)_2SiCl_3$
(7) $CF_3(CF_2)_7(CH_2)_2Si(NCO)_3$
(8) $CF_3(CF_2)_5(CH_2)_2SiCl_3$
(9) $CF_3(CF_2)_5(CH_2)_2Si(NCO)_3$
(10) $CF_3(CF_2)_5(CH_2)_2SiCH_3Cl_2$
(11) $CF_3(CF_2)_7C_6H_4SiCl_3$
(12) $CF_3(CF_2)_7(CH_2)_2TiCl_2$
(13) $CF_3(CF_2)_5(CH_2)_2Ti(OCH_3)Cl$
(14) $CF_3(CF_2)_7C_6H_4TiCl_2$

While only linear chain molecules are illustrated here, the molecule may be a molecule having a side chain group if it is a material that has a hydrolyzable group having at least Si or Ti and a fluorocarbon group.

Also, a method for roughening a surface of a base material may be used together. In this case, any art-recognized technique such as polishing by a metal brush, sand blasting, or a chemical etching method can be used. However, the method need not be limited to these methods as long as it can roughen a surface of a base material at a micron level. In this case, when the roughness of a surface of a base material is at least 0.1 to 50 μm, preferably 0.3 to 10 μm, very high water repellency can be obtained, and therefore a coating film that has excellent water separation can be obtained. Particularly, when the roughness is 0.3 to 10 μm, a contact angle of 170° or more to water can be obtained.

Also, any method such as a dipping method, a spraying method, or a brush coating method can be applied as a coating method for a material that has a hydrolyzable group having at least Si or Ti and a fluorocarbon group. Furthermore, the material may be directly used for coating, or it may be diluted with a nonaqueous solvent such as normal paraffin or xylene for coating. When diluting the material, by using a nonaqueous solvent that does not contain water at all, the volatility can be high, the time for coating and drying can be shortened, and also it is convenient for protecting a hydrolyzable group before coating.

Also, the amount of the material that has a hydrolyzable group having at least Si or Ti and a fluorocarbon group is preferably 1 to 50% by weight. If the amount is less than this, the film becomes too thin, worsening the water repellency. If the amount is more than this, the viscosity of the solution can become too high, causing difficulty in coating.

Also, by adding at least one filler selected from the group consisting of a fine particle and a whisker in coating with a solution that contains the above material, the second coating film of the present invention, that is, a film that comprises a fine particle or a whisker, can be formed. In this case, the amount of the filler is preferably 1 to 30% by weight. If the amount is less than this, the filler does not provide the desired effect. If the amount is greater than this, the coating film can become fragile, decreasing its durability.

In the above solution, it is preferable that except for the material that has a hydrolyzable group having at least Si or Ti and a fluorocarbon group and the filler, a nonaqueous organic solvent is employed. Therefore, the amount of the nonaqueous organic solvent is preferably in the range of 20 to 98% by weight.

Also, by forming such a thin film that comprises a microcrystalline polymer having at least a fluorocarbon group and has a rough surface on a surface of the fin of the heat exchanger of an air conditioner, an air conditioner that does not require an extra heater for thawing, has very high efficiency, and provides excellent amenity can be provided.

Next, a coating apparatus for a hydrolysis-hardening coating material of the present invention will be described by referring to FIG. 2.

Figure 2:
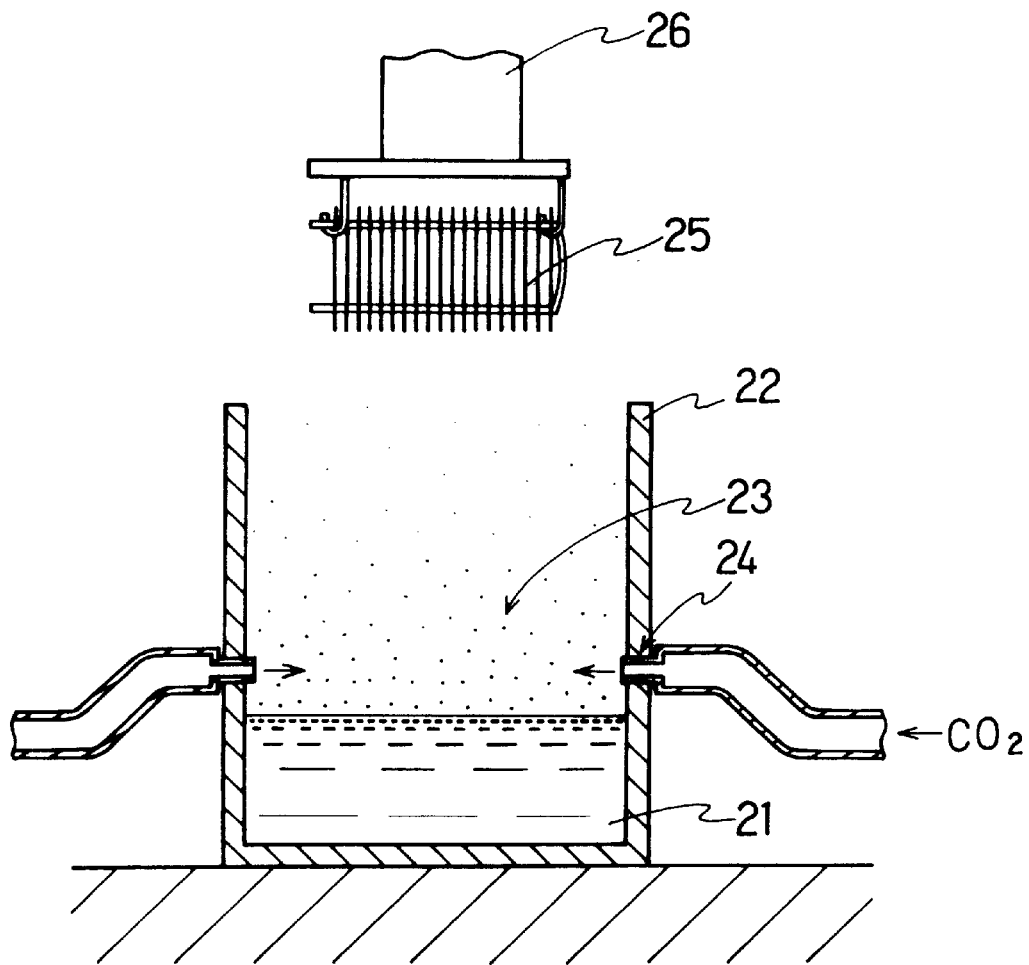
FIG. 2 is a cross-sectional view for conceptually illustrating a coating apparatus and a coating method of Example 4 of the present invention.

FIG. 2 illustrates an example of a coating apparatus of the present invention, and it is a conceptual view of a coating apparatus that has a dipping vessel 22 for putting a hydrolysis-hardening coating material 21 in and a layer (gas seal layer) of a gas heavier than air (for example, carbon dioxide) 23 for preventing the contact of the coating material and air that is provided on a surface of the hydrolysis-hardening coating material put in the dipping vessel 22. In FIG. 2, an assembled heat exchanger fin for an air conditioner 25 is dipped and pulled up across the layer of a gas heavier than air 23 by using a lift 26, and is taken out in air, while continuously spraying a gas heavier than air from a nozzle for a gas heavier than air 24 on the surface of the coating material in the dipping vessel in which the hydrolysis-hardening coating material is put, and producing the layer of a gas heavier than air 23 for preventing the contact of the coating material and air on the surface of the coating material. Thus, the coating apparatus allows for the surface of the fin to be coated with the hydrolysis-hardening coating material, while the contact of hydrolysis-hardening coating material 21 and air is prevented, without the use of a cover. Because of this, continuous coating can be performed.

Next, the present invention will be described in more detail using examples.

In the following examples, a contact angle to water is measured by a Wilhelmy method using Wetability measuring apparatus, MODEL WET-6000, RHESCA CO., LTD. In other words, a base material on which a microcrystalline polymer is formed is inserted perpendicularly into the surface of water, and a contact angle is measured by a stress from the surface of water then. A contact angle in forward movement is calculated by a stress when the base material is inserted, and a contact angle in backward movement is calculated by a stress when the base material is pulled up. Also, a contact angle refers to an angle when a water drop stays still. A dynamic contact angle refers to a contact angle when a water drop slides down. The contact angle of the forward portion of a water drop is a contact angle in forward movement, and the contact angle of the backward portion of a water drop is a contact angle in backward movement.

EXAMPLE 1

A fin 11 that is made of well washed aluminium (Al) was previously prepared (FIG. 1A). Next, by using CF$_3$(CF$_2$)$_7$—(CH$_2$)$_2$—SiCl$_3$ as a material that has a hydrolyzable group having at least Si or Ti and a fluorocarbon group, and diluting it with cyclohexamethyl trisiloxane as a nonaqueous solvent at a concentration of 10 vol. %, a solution for forming a coating film was prepared. The fin was coated with this solution to a thickness of 1 to 10 µm by a brush. Then, the cyclohexamethyl trisiloxane was vaporized in an atmosphere having a relative humidity of 75% (good results were obtained at 60% or more.) at room temperature, and CF$_3$(CF$_2$)$_7$—(CH$_2$)$_2$—SiCl$_3$ that remained on the fin was rapidly hydrolyzed with the moisture in the atmosphere. Then, the moisture in air and a —SiCl$_3$ group dehydrochlorinated to form the following Formula 4. The reaction ended in about ten minutes, and a microcrystalline polymer 12 that has a fluorocarbon group and is crosslinked by a siloxane bond was formed on fin 11 (FIG. 1B).

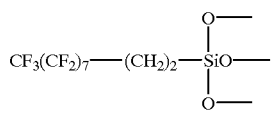

This film was also covalently bonded to a surface of the base material by a —SiO— bond as shown in FIG. 1C (an enlarged view of an X part in FIG. 1B) and had little peeling and very high weather resistance. Also, the roughness of the surface was in the range of 1 to 40 µm, and the contact angle to water was 171°. Furthermore, a dynamic contact angle was measured assuming the application to an air conditioner. The results are shown in Table 1.

When using a material that has a Ti hydrolyzable group, similar results were obtained. Furthermore, when the hydrolyzable group having Si or Ti was a halosilyl group, an alkoxysilyl group, a silane group, an isocyanate silane group, an alkoxytitanium group, a titanium halide group, or an isocyanate titanium group, similar results were obtained.

When using a compound shown in the Formula 3 as a material that has a fluorocarbon group and a hydrolyzable group, similar results were obtained.

In the process of the above experiment, it has become clear that the apparent reaction speed of dehydrochlorination (a hydrolysis reaction in the example), that is, the humidity in the reaction atmosphere, is critical. By more detail examination, it has become clear that there is a close relationship between the roughness of the surface of the base material, the speed of the hydrolysis reaction, and the growth of the microcrystal, and that the roughness of the surface of the coating film can be made greater as the reaction speed becomes higher. In the experiment similar to Example 1, it has become clear that by setting the humidity 35% or more, a difference in the COS θ of a contact angle between in the forward and backward movements of a water drop can be 0.1 or less, which is practically preferable.

EXAMPLE 2

Figure 3A:
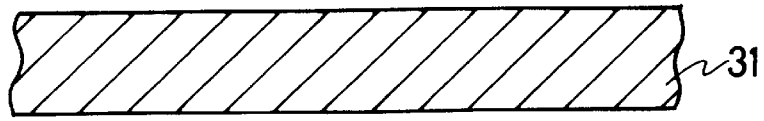
FIGS. 3A and 3B illustrate a surface treatment process in Example 2 of the present invention.

A fin 31 that is made of well washed Al was previously prepared (FIG. 3A). Next, 5% by weight of silica fine particles having an average particle diameter of 20 nm (alumina or glass fine particles or fluororesin fine particles or oxide whiskers may be used) and CF$_3$(CF$_2$)$_7$—(CH$_2$)$_2$—SiCl$_3$ (a concentration of 10% by weight) as a coating material component compound that has a hydrolyzable group having Si or Ti and a fluorocarbon group were diluted with a nonaqueous solvent of normal paraffin (a boiling point of 150° C.) for preparation. The fin 31 that is made of Al was coated with this coating material for forming a coating film to a thickness of 1 to 10 µm by using a brush. Then, the normal paraffin was vaporized in an atmosphere having a relative humidity of 75% (good results were obtained at a relative humidity of 60% or more) at room temperature, and the coating material component compound was rapidly hydrolyzed with the moisture in the atmosphere, with a fine particle 32 that remained on the fin being as a core. Then, the moisture in air and a —SiCl$_3$ group dehydrochlorinated, and a coating film shown by the Formula 4 has formed.

Figure 3B:
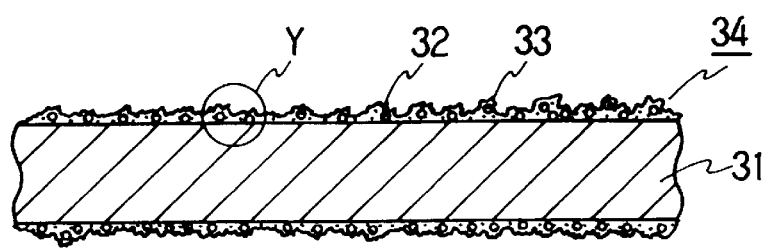
Figure 3C:
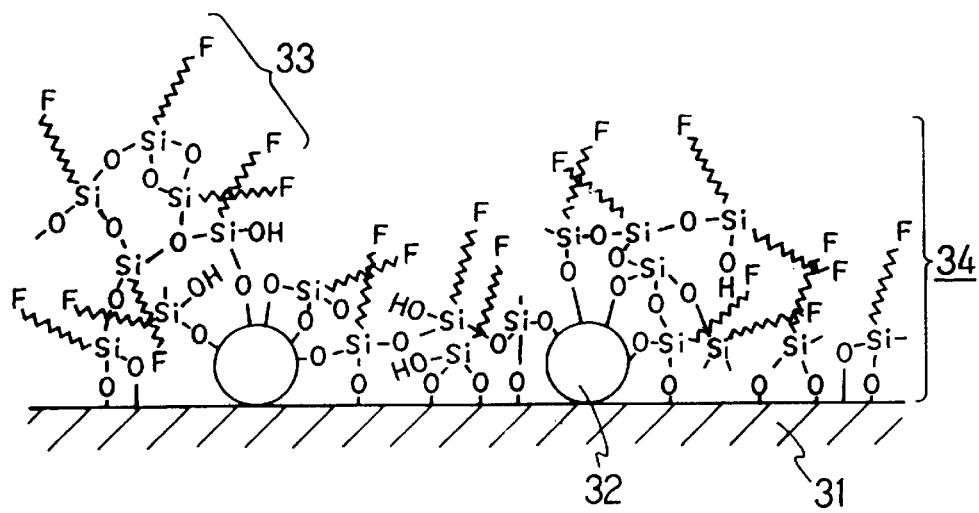
FIG. 3C is a cross-sectional view in which a Y part of a surface of the base material in FIG. 3B is enlarged.

This reaction ended in about ten minutes, and a film 34 that comprises a microcrystalline polymer 33 having a fluorocarbon group and being crosslinked by a siloxane bond and has a rough surface was formed on fin 31 (FIG. 3B). This film was also bonded to a surface of the base material by a —SiO— bond as shown in FIG. 3C and had little peeling and very high weather resistance. Also, the roughness of the surface was 1 to 40 µm in average, and the contact angle to water was 172°. Furthermore, a dynamic contact angle was measured assuming the application to an air conditioner. The results are shown in Table 1.

When using a material that has a Ti hydrolyzable group, similar results were obtained. Furthermore, when the hydrolyzable group having Si or Ti was a halosilyl group, an alkoxysilyl group, a silane group, an isocyanate silane group, an alkoxytitanium group, a titanium halide group, or an isocyanate titanium group, similar results were obtained.

EXAMPLE 3

Figure 4A:
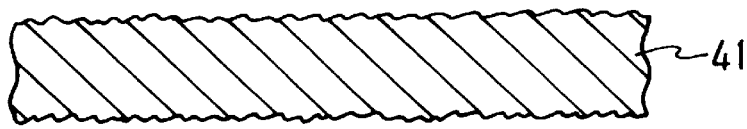
FIGS. 4A and 4B are cross-sectional views for illustrating a surface treatment process in Example 3 of the present invention.

A fin base material 41 that is made of well washed Al was previously prepared by rubbing an aluminium (Al) sheet by a wire brush, and forming a roughness of 8 to 10 µm on the surface (FIG. 4A). Next, CF$_3$(CF$_2$)$_7$—(CH$_2$)$_2$—SiCl$_3$ as a material that has a hydrolyzable group having at least Si or Ti and a fluorocarbon group was diluted with toluene as a nonaqueous solvent at a concentration of 10% by weight for preparation. The fin base material was coated with this solution for forming a coating film to a thickness of 1 to 10 µm by a brush. Then, the toluene was vaporized in an atmosphere having a relative humidity of 40% (good results were obtained at a relative humidity of 30 to 60%.) at room temperature, and CF$_3$(CF$_2$)$_7$—(CH$_2$)$_2$—SiCl$_3$ that remained on the fin base material was rapidly hydrolyzed with the moisture in the atmosphere. Then, the moisture in air and a —SiCl$_3$ group dehydrochlorinated, and a coating film shown by the Formula 4 was formed.

Figure 4B:
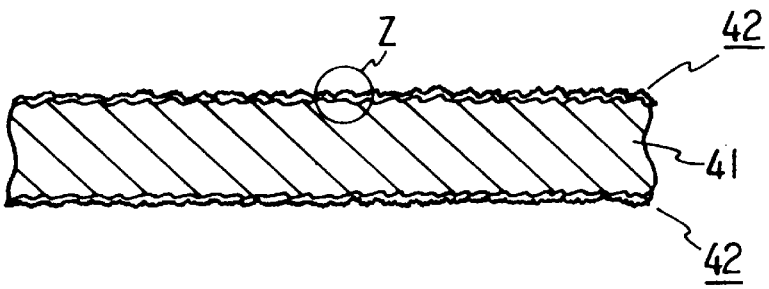
Figure 4C:
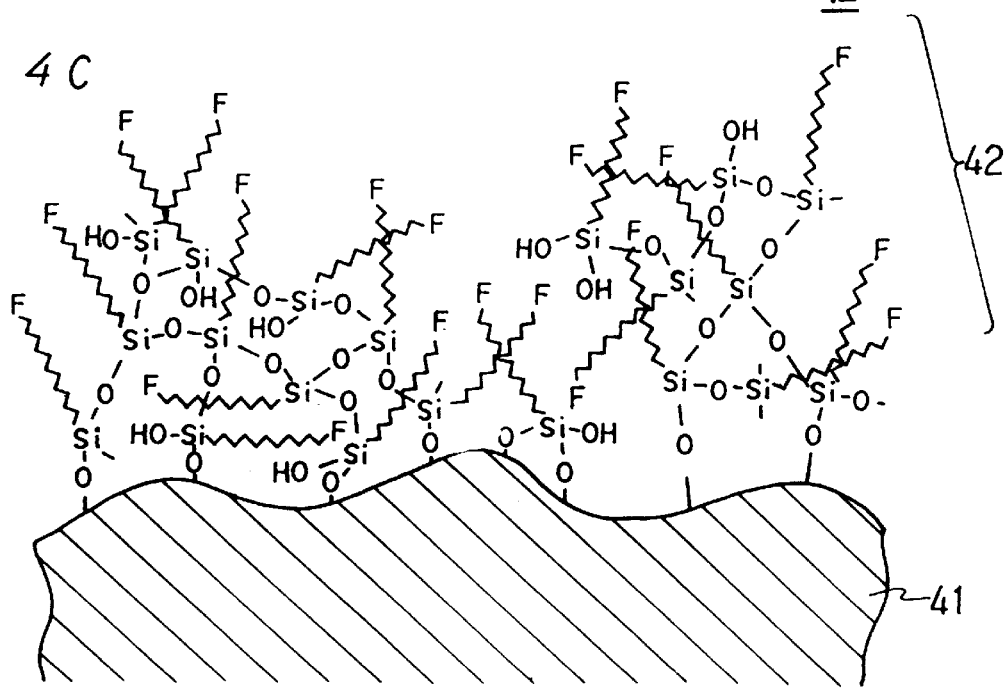
FIG. 4C is a cross-sectional view in which a Z part of a surface of the base material in FIG. 4B is enlarged.

The reaction almost ended in about ten minutes, and a film 42 that comprises a microcrystalline polymer having a fluorocarbon group and being crosslinked by a siloxane bond and has a rough surface was formed on fin base material 41 (FIG. 4B). This film 42 had little peeling due to the effect of being also bonded to the surface of the base material by a —SiO— bond and the effect of the roughness of the surface of the base material as is shown in FIG. 4C as an enlarged view of a Z part, and had very high weather resistance. Also, the roughness of the surface was 1 to 12 µm, and the contact angle to water was 174°. Furthermore, a dynamic contact angle was measured assuming the application to an air conditioner. The results are shown in Table 1.

Also, the suitable roughness of the surface of the base material is in the range of 0.1 to 50 µm. Similar results were obtained by using any method for roughening a surface, such as a sand blasting method or an etching method, as long as this surface roughness can be realized.

The humidity of the atmosphere in which toluene is vaporized after coating with the solution for forming a coating film by a brush depends on the surface roughness. For example, when the surface roughness is in the range of 0.1 to 8 $\mu$m, the relative humidity is preferably 60% (good results were obtained at a relative humidity of 40 to 80%.). When the surface roughness is in the range of 8 to 50 $\mu$m, the relative humidity is preferably 40% (good results were obtained at a relative humidity of 30 to 60%.). When the humidity was lower than this, a microcrystalline polymer was not formed, and the water repellency was decreased. Also, when the humidity was higher than the above range, the film became fragile, and the durability was decreased.

Also, when using a material that has a Ti hydrolyzable group, similar results were obtained. Furthermore, when the hydrolyzable group having Si or Ti was a halosilyl group, an alkoxysilyl group, a silane group, an isocyanate silane group, an alkoxytitanium group, a titanium halide group, or an isocyanate titanium group, similar results were obtained. The results are shown in Table 1.

EXAMPLE 4

Previously, using an coating apparatus that has a dipping vessel 22 for putting a hydrolysis-hardening coating material 21 in and a nozzle 24 for blowing off a carbon dioxide gas as a gas heavier than air (argon gas has the same effect) as shown in FIG. 2, a predetermined amount of a hydrolysis-hardening coating material (a coating material that is prepared by diluting $CF_3(CF_2)_7$—$(CH_2)_2$—$SiCl_3$ with normal paraffin (a boiling point of 150° C.) at a concentration of 10% by weight) is put in the dipping vessel 22. Immediately after that, a constant amount of carbon dioxide gas is continuously blown off from nozzle 24 for a carbon dioxide gas. Thus, a carbon dioxide gas layer (gas seal layer) 23 for preventing the contact of the coating material and air is formed on a surface of the coating material.

Then, a heat exchanger fin for an air conditioner 25 that is completely assembled is dipped and pulled up across carbon dioxide gas layer 23 by using a lift 26, and is taken out in air. Coating operation was continuously performed for a day. As a result, the coating material was not degraded at all, without becoming cloudy with a color of white. In other words, the fin surface could be uniformly coated with the hydrolysis-hardening coating material to a thickness of 1 to 10 $\mu$m, while continuously preventing the contact of hydrolysis-hardening coating material 21 and the moisture in the air, without closing a cover of the dipping vessel. Also, no degradation of the hydrolysis-hardening coating material due to the moisture in the air occurred.

Then, the normal paraffin was vaporized in an air atmosphere having a relative humidity of 75% (although good results were obtained at a relative humidity of 60% or more.) at room temperature, and $CF_3(CF_2)_7$—$(CH_2)_2$—$SiCl_3$ that remained on the fin was rapidly hydrolyzed with the moisture in the atmosphere. Then, the moisture in air and a —$SiCl_3$ group dehydrochlorinated, and a coating film shown by the Formula 4 was formed.

The reaction ended in about ten minutes, and a film that comprises a microcrystalline polymer having a fluorocarbon group and being crosslinked by a siloxane bond and has a rough surface was formed on a heat exchanger fin 25. This film was also bonded to a surface of the base material by a —SiO— bond and had little peeling and very high weather resistance. Also, the roughness of the surface was 1 to 40 $\mu$m, and the contact angle to water was 171°. Furthermore, a dynamic contact angle was measured assuming the application to an air conditioner. The results are shown in Table 1.

When using a material that has a Ti hydrolyzable group, similar results were obtained. Furthermore, when the hydrolyzable group having Si or Ti was a halosilyl group, an alkoxysilyl group, a silane group, an isocyanate silane group, an alkoxytitanium group, a titanium halide group, or an isocyanate titanium group, similar results were obtained.

COMPARATIVE EXAMPLE 1

Dehydrochlorination was performed, on the same condition as in Example 1 except for the reaction atmosphere, at room temperature in air having a relative humidity of 20%. In this case, similarly, the reaction ended in about 14 to 15 minutes, and a film that comprises a microcrystalline polymer having a fluorocarbon group and being crosslinked by a siloxane bond and has a rough surface was formed on a heat-dissipating sheet. This film was also bonded to a surface of the base material by a —SiO— bond and had little peeling and very high weather resistance. However, the roughness of the surface was 0.1 $\mu$m or less with large waviness, and the contact angle to water was 149°. The measurement result of the dynamic contact angle is shown in Table 1 with Example 1.

COMPARATIVE EXAMPLE 2

On the same condition as in Example 4 except for eliminating the carbon dioxide gas layer, that is, the case where a seal gas is not blown off, the surface of the coating material became cloudy with a color of white in about one hour, and the coating material was degraded.

TABLE 1

|  | * | | difference |
|---|---|---|---|
|  | ** | *** | in COS θ *1 |
| Example 1 | 175 | 162 | 0.042 |
| Example 2 | 175 | 169 | 0.0055 |
| Example 3 | 177 | 172 | 0.0083 |
| Example 4 | 175 | 163 | 0.040 |
| Comparative Example | 153 | 84 | 0.99 |

*a contact angle to water (°)
**a contact angle in forward movement
***a contact angle in backward movement
*1A difference in cos θ is a difference between respective cosines of a contact angle in forward movement ($\theta$a) and a contact angle in backward movement ($\theta$r), that is, cos $\theta$ r–cos $\theta$a. This difference in cosine is related to the fall angle of a water drop (an angle when a water drop starts sliding) $\alpha$ as follows:

$$m\ g\ \sin\ \alpha = 2R\gamma(\cos\ \theta r - \cos\ \theta a)$$

in which m represents the mass of a water drop, g represents the acceleration of gravity, R represents the radius of the surface of a water drop in contact with a surface of a base material, and $\gamma$ represents the surface tension of water. In other words, as a difference in cosine is smaller, a water drop falls more easily.

As is apparent from Table 1, the ones that were treated in the examples of the method of the present invention peeled little by rubbing with a finger, and had a very high dynamic contact angle. Also, a difference in COS θ could be 0.01 or less, and the surface properties with little adhesion of a water drop could be achieved.

Furthermore, by comparing Examples 1 and 3, it has become clear that a difference in COS θ can be 0.01 or less, and higher performance than that of a flat base material is obtained by setting the roughness of the surface of the base material be in the range of 0.1 to 50 micron. Also, as is apparent from Table 1, the ones that were treated by the method of the present invention had a very high dynamic contact angle. Also, a difference in the COS θ of a contact angle between in forward and backward movements could be 0.05 or less, and the surface properties with little adhesion of a water drop could be achieved.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A water repellent coating film comprising a polymer comprising a fluorocarbon group formed on a surface of a substrate, wherein the polymer of the film is a microcrystalline polymer and has a rough surface, and at least some of the molecules forming the film are covalently bonded to the surface of the substrate.

2. The water repellent coating film according to claim 1, wherein the microcrystalline polymer comprises a fluorocarbon group and is crosslinked by at least one bond selected from the group consisting of a siloxane (—SiO—) bond and a titanium-oxygen (—TiO—) bond.

3. The water repellent coating film according to claim 1, wherein the film further comprises a core comprising at least one material selected from the group consisting of a fine particle and a whisker.

4. The water repellent coating film according to claim 3, wherein the microcrystalline polymer having a fluorocarbon group is crosslinked by at least one bond selected from the group consisting of a siloxane (—SiO—) bond and a titanium-oxygen (—TiO—) bond and is chemically bonded to the core.

5. The water repellent coating film according to claim 2, wherein the microcrystalline polymer having a fluorocarbon group that is crosslinked by at least one bond selected from the group consisting of a siloxane bond and a titanium-oxygen (—TiO—) bond is formed by a hydrolysis reaction.

6. The water repellent coating film according to claim 1, wherein the roughness of the surface is in the range of 0.1 to 100 μm.

7. The water repellent coating film according to claim 1, wherein the roughness of the film is in the range of 0.1 to 100 μm.

8. The water repellent coating film according to claim 1, wherein the film is cloudy with a color of white or is opaque.

9. The water repellent coating film according to claim 1, wherein the water repellent coating film is formed on a surface of a fin of a heat exchanger.

10. The water repellent coating film according to claim 9, wherein a surface of a base material of the fin is roughened.

11. The water repellent coating film according to claim 10, wherein the roughness of the surface of the base material is in the range of 0.1 to 50 μm.

12. The water repellent coating film according to claim 9, wherein the fin is incorporated in a heat exchange part of an air conditioner.

* * * * *